(12) United States Patent
Tsirtsis

(10) Patent No.: US 7,986,666 B2
(45) Date of Patent: *Jul. 26, 2011

(54) CREATION AND TRANSMITTAL OF ADD MESSAGES

(75) Inventor: George Tsirtsis, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/624,185

(22) Filed: Jan. 17, 2007

(65) Prior Publication Data

US 2008/0170517 A1 Jul. 17, 2008

(51) Int. Cl.
*H04W 4/00* (2009.01)
(52) U.S. Cl. ......... 370/331; 370/338; 370/328; 455/436
(58) Field of Classification Search .......... 370/310–350, 370/395.52, 395.21; 455/436–444, 550.1–553.1, 455/561, 424–425
See application file for complete search history.

(56) References Cited

U.S. PATENT DOCUMENTS

| | | | |
|---|---|---|---|
| 6,195,705 B1 | 2/2001 | Leung | |
| 6,771,623 B2 | 8/2004 | Ton | |
| 7,272,123 B2 * | 9/2007 | Wall | 370/331 |
| 7,385,957 B2 | 6/2008 | O'Neill | |
| 2002/0141360 A1 * | 10/2002 | Baba et al. | 370/331 |
| 2004/0066757 A1 * | 4/2004 | Molteni et al. | 370/329 |
| 2004/0156346 A1 * | 8/2004 | O'Neill | 370/338 |
| 2006/0050692 A1 * | 3/2006 | Petrescu et al. | 370/389 |
| 2008/0171548 A1 * | 7/2008 | Tsirtsis et al. | 455/437 |

OTHER PUBLICATIONS

International Search Report—PCT/US08/051368, International Search Authority—European Patent Office—Rijswijk—Jun. 11, 2008.
Written Opinion—PCT/US08/051368, International Search Authority—European Patent Office—Munich—Jun. 11, 2008.

* cited by examiner

*Primary Examiner* — Kamran Afshar
(74) *Attorney, Agent, or Firm* — Milan I. Patel; Jonathan T. Velasco

(57) ABSTRACT

Described herein are mechanisms and methods that facilitate enabling a first network module to "take over" for a second network module. An access router can be configured to act as a regional mobility agent with respect to a wireless terminal. The wireless terminal can then identify a different access router that is to act as a regional mobility agent, and transmit such request to a mobility agent. The mobility agent can create a tunnel with the access router that is acting as the mobility agent, and such access router can create an add message and transmit such message to other access routers associated with the wireless terminal. The add message informs the access routers that a particular access router is acting as a regional mobility agent and aids in creating tunnels between access routers.

42 Claims, 13 Drawing Sheets

CREATION AND TRANSMITTAL OF ADD MESSAGES

BACKGROUND

I. Field

The following description relates generally to wireless communications, and, amongst other things, to flexible communication schemes for wireless communications systems.

II. Background

Wireless networking systems have become a prevalent means to communicate with others worldwide. Wireless communication devices, such as cellular, telephones, personal digital assistants, and the like have become smaller and more powerful, in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that, base station can be interested in receiving one, more than one or all the data streams carried by the composite stream. Likewise, a user device can transmit data to the base station or another user device.

In wireless networks that enable a wireless terminal to connect to the Internet, Mobile IP (MIP) is a common protocol that is often utilized to facilitate mobility of the wireless terminal while maintaining connection to the Internet. Using MIP, wireless terminals can alter their point of attachment to the Internet without altering Internet Protocol (IP) addresses associated therewith. Thus, mobile devices can transition amongst several different local area networks (LANs) that are associated with different IP addresses without forcing the mobile to alter a point of attachment to the Internet.

Additionally, in some systems Mobile IF can be utilized to enable a wireless terminal to be associated with multiple links at different access points. More particularly, multiple tunnels can be created through utilization of Mobile IP, and certain traffic can be directed by way of each of the tunnels (e.g., based upon expected throughput measured signal-to-noise ratio, or other suitable factor(s)).

SUMMARY

The following presents a simplified summary in order to provide a basic understanding of some aspects of the disclosed subject matter. This summary is not an extensive overview, and is not intended to identify key/critical elements or to delineate the scope of such subject matter. Its sole purpose is to present some concepts in a simplified form as a prelude to the more detailed description that is presented later.

Briefly described, the subject matter disclosed in more detail below relates to a first network module "taking over" for a second network module with respect to an access terminal. In more detail, a wireless terminal can be associated with a first foreign agent that acts as a regional mobility agent for the access terminal. Such foreign agent can be resident within an access router and/or be a separate network entity. As signal strength perceived at the wireless terminal alters, the wireless, terminal can request that a second network module act as a regional mobility agent for the wireless terminal. The wireless terminal can additionally identify one or more access routers with respect to which the wireless terminal desires links. A mobility agent can receive the request and can create a tunnel with the second network module. The second network module can then create a message (an add message) and transmit such message to the identified wireless terminals. The add message indicates that the second network module is acting as the regional mobility agent for the wireless terminal and further indicates that recipients of the add message will he receiving traffic from the second network module intended for the wireless terminal. The add message also enables recipients thereof to revoke tunnels associated with network modules previously acting as a regional mobility agent for the wireless terminal.

In a related aspect is a method that is undertaken at a first network module. The method can comprise receiving an indication from a wireless terminal that the first network module is to act as a mobility agent with respect to the wireless terminal and informing a second network module that the first network module is to act as the mobility agent with respect to the wireless terminal.

In accordance with another aspect is a communications apparatus that can include a memory that comprises instructions for receiving an indication that a first mobility agent is to act as a primary mobility agent with respect to a wireless terminal. The instructions can also include informing a second mobility agent, previously acting as the primary mobility agent with respect to the wireless terminal, that the first mobility agent will henceforth be acting as the primary mobility agent. The communications apparatus can also include a processor that is configured to execute the instructions.

In accordance with another aspect is a communications apparatus that can comprise a means for receiving an indication from a wireless terminal that a first network module is to act as a regional mobility agent with respect to the wireless terminal. The communications apparatus can also include a means for informing a second network module that the first network module is to act as the regional mobility agent with respect to the wireless terminal.

According to another aspect is a computer-readable medium that can comprise computer-executable instructions. The instructions can include receiving an indication that a first mobility agent is to act as a primary mobility agent with respect to a wireless, terminal. The instructions can further include informing a second mobility agent, previously acting as the primary mobility agent with respect to the wireless terminal, that the first mobility agent will henceforth be acting as the primary mobility agent.

According to a further aspect is a processor that can be configured to execute instructions for determining that a first access router will be acting as a regional mobility agent with respect to a wireless terminal and informing a second access router previously acting as a regional mobility agent that the first access router will be acting as the regional mobility agent.

In accordance with another aspect is a method undertaken at a wireless terminal. The method can comprise identifying an access router that is to act as a regional mobility agent and indicating to a mobility agent associated with the wireless terminal the identity of the access router.

In accordance with a further aspect is a wireless communications apparatus. The wireless communications apparatus can include a memory and a processor. The memory can comprise instructions for determining an access router that desirably acts as a regional mobility agent with respect to the apparatus and determining one or more other access routers with respect to which a physical link is desired. The instructions can also include transmitting an identity of the access router and identifies of the one or more other access routers to a mobility agent. The processor can he configured to execute the instructions in the memory.

In accordance with another aspect is a computer-readable medium comprising computer-executable instructions for identifying at a wireless terminal an access router that desirably acts as a regional mobility agent with respect to the wireless terminal and informing a mobility agent, of the identity of the access router that desirably acts as the regional mobility agent with, respect to the wireless terminal.

According to another aspect is a wireless communications apparatus that can comprise a means for determining that an access terminal is to act as a regional mobility agent and a means for informing a mobility agent that the access router is to act as the regional mobility agent.

According to yet another aspect is a processor that can be configured to execute instructions for identifying an access router that is to act as a regional mobility agent with respect to a wireless terminal and indicating to a mobility agent associated with the wireless terminal the identity of the access router.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
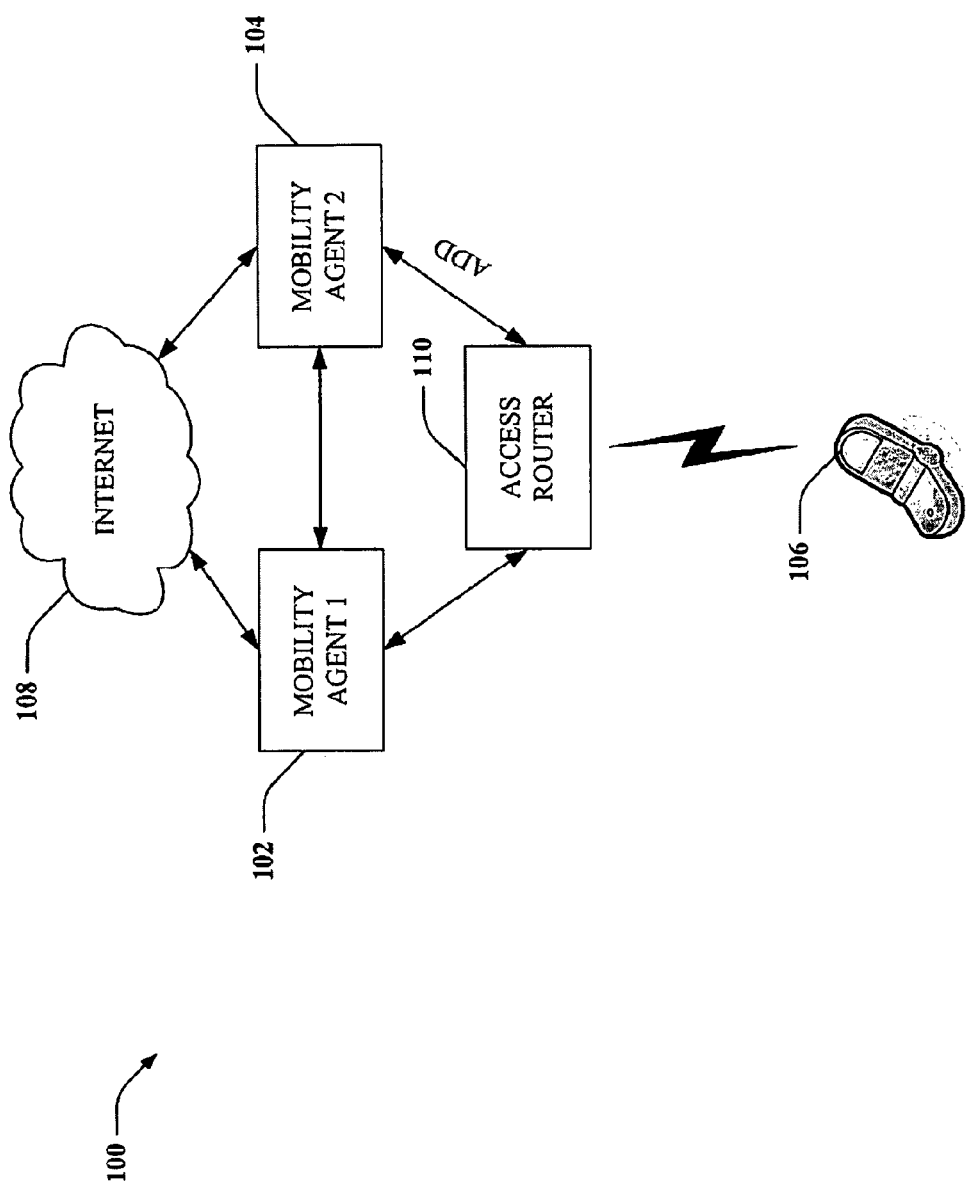
FIG. 1 is an example high-level block diagram of a wireless network wherein add messages are generated and transmitted.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It maybe evident, however, that such subject matter may be practiced without these specific details. In other instances, well-known structures and devices are shown in block diagram form in order to facilitate describing the disclosed subject matter.

Furthermore, various embodiments are described herein in connection with an access terminal. An access terminal can also be called a system, a subscriber unit, subscriber station, mobile station, user equipment, mobile device, remote station, remote terminal, user terminal, terminal, user agent, or user device. For example, an access terminal can be a cellular telephone, a cordless telephone, a Session Initiation Protocol (SEP) phone, a wireless local loop (WLL) station, a PDA, a handheld device having wireless connection capability, a processor within, a mobile device, or other processing device connected to a wireless modem.

Moreover, aspects of the disclosed subject matter may be implemented as a method, apparatus, or article of manufacture using standard programming and/or engineering techniques to produce software, firmware, hardware, or any combination thereof to control a computer to implement various aspects described herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, it can be recognized that many modifications may be made to this configuration without departing from the scope or spirit of what is described herein.

Turning now to the drawings, FIG. 1 illustrates a network architecture 100 that can be used to exemplify one or more aspects of the disclosed subject, matter. Architecture 100 includes a first mobility agent 102 and a second mobility agent 104, wherein the mobility agents 102 and 104 can be routers on a home or foreign network of a wireless terminal 106 that maintain information regarding routing of packets received from the Internet 108 to wireless terminal 106. In accordance with some aspects, mobility agent can be a home agent (e.g., Mobile IPv4 home agent, Mobile IPv6 home agent, and so forth), a regional foreign agent or regional home agent, or other types of mobility agents. In example architecture 100, mobility agents 102 and 104 can be associated with wireless terminal 106 for redundancy purposes, such that first mobility agent 102 is currently servicing wireless terminal 106 while second mobility agent 104 acts as a standby mobility agent for wireless terminal 106. Additionally, mobility agents 102 can be regional mobility agents, foreign agents, and/or other suitable network module.

Architecture 100 additionally includes an access router 110, wherein access router 110 can relay data to and receive data from wireless terminal 106. Additionally, access router 110 provides an over-the-air (OTA) point of attachment for wireless terminal 106.

In accordance with some aspects described herein, second mobility agent 104 can generate an "add" message and provide such message to access router 110, wherein the add message informs access router 110 that second mobility agent 104 is now a primary mobility agent 104 with respect to access terminal 106, and that access router 110 will be receiving data from mobility agent 104. Such an add message, for example, can accord to Mobile IP. Additionally, second mobility agent 104 can inform first mobility agent 102 that second mobility agent 104 will be the primary mobility agent with respect to wireless terminal. Still further, first mobility agent 102 can inform access router 110 that a tunnel therebetween has been revoked. Alternatively, access router 110 can inform first mobility agent 102 that a tunnel therebetween has been revoked.

In accordance with some aspects, access router 110 does not participate in signaling between access terminal 106 and home agents 102, 104. In such aspects, second home agent 104 provides the "add" message directly to access terminal 106 and first, home agent 102 can information access terminal 102 that a tunnel between first home agent 102 and access terminal 102 has been revoked.

Figure 2:
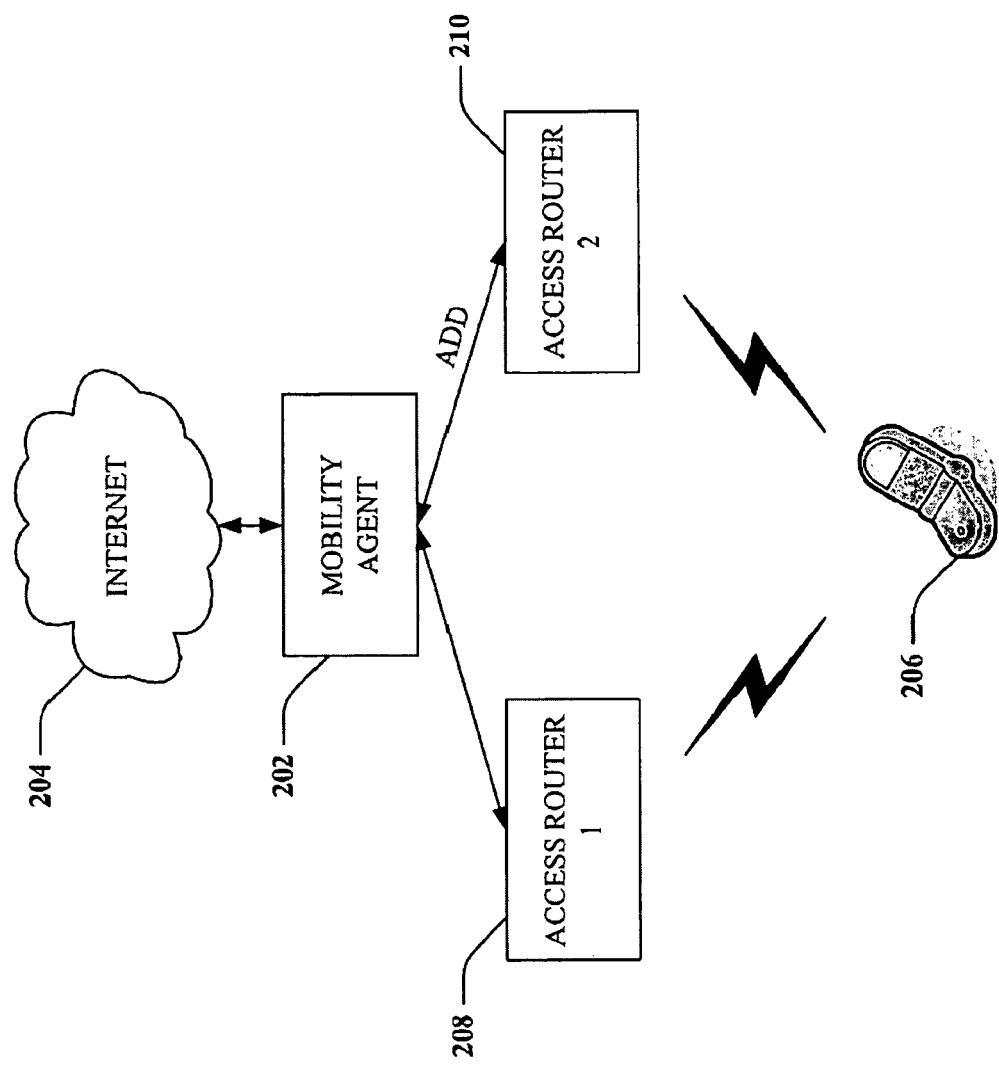
FIG. 2 is an example block diagram of a wireless network wherein add messages are generated and transmitted.

Now referring to FIG. 2, an example network architecture 200 that is provided to illustrate another utilization of an add message is illustrated. Architecture 200 includes a mobility agent 202, which can act as a point of attachment to the Internet 204 for a wireless terminal 206. Mobility agent 202 can provide data to a first access router 206 and/or to a second access router 20S. For example, wireless terminal 206, through utilization of Mobile IP, can have links simultaneously with first access router 208 and second access router 210. In an example, wireless terminal 206 may solely have a link with first access router 208, such that mobility agent 202 provides data intended for wireless terminal 206 by way of first access router 208. Therefore, a tunnel for data traffic exists between mobility agent 202 and access router 208.

As wireless terminal 206 geographically traverses over a particular region, signal strength perceived at wireless terminal 206 in association with second access router 210 can be sufficient enough to merit a link between wireless terminal 206 and second access router 210. In more detail, wireless terminal 206 can provide a message by way of Mobile IP to first access router 208 that indicates that a desired care of address (CoA) is associated with first access router 208 and an alternate CoA is associated with second access router 210. Such information can then be relayed by access router 208 to mobility agent 202, which can confirm receipt of the information. Mobility agent 202 can then provide an add message (in the form of a command) to second access router 210, wherein the add message includes a home address associated with wireless terminal 206, an indication of an identity of first access router 208, and an identity of the mobility agent. Contents of the add message can include more or less information depending upon context. Second access router 210 can then confirm the add message, and mobility agent 202 can create tunnels between mobility agent 202 and second access router 210 (and refresh a tunnel between mobility agent 202 and first access router 208). In accordance with some aspects, wireless terminal 206 provides the message to mobility agent 202 by routing the signal through first access router 208 and/or second access router 210. In such aspects, access routers 208, 210 do not participate in (or process) the signaling between wireless terminal 206 and mobility agent 202.

Figure 3:
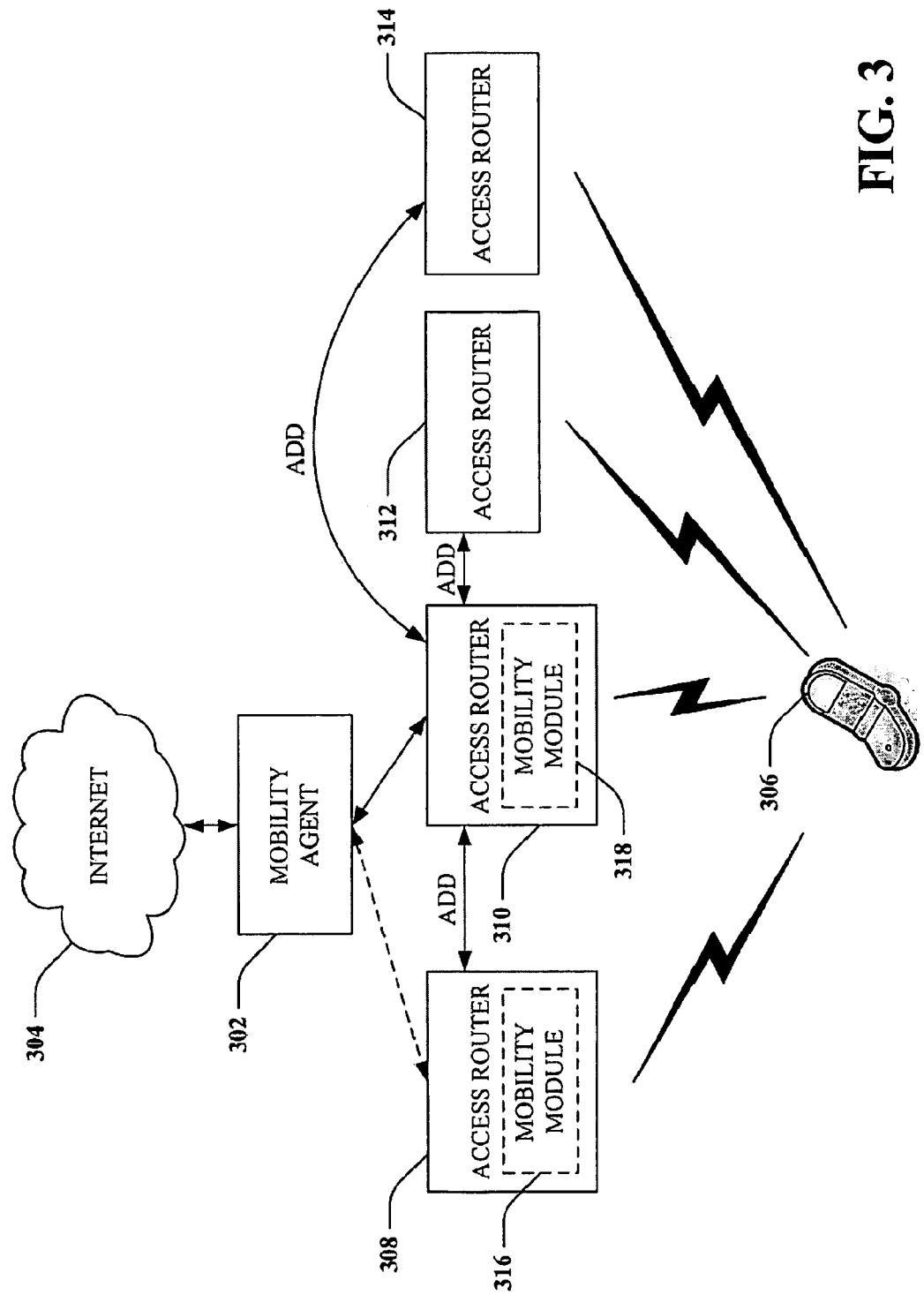
FIG. 3 is an example block diagram of a wireless network where access routers act as regional mobility agents.

Now turning to FIG. 3, an example network architecture 300 is illustrated. Architecture 300 includes a mobility agent 302, which acts as a point of attachment to the Internet 304 with respect to a wireless terminal 306. Mobility agent 302 is communicatively coupled to one or more access routers 308-314, such that data intended for wireless terminal 306 is directed from mobility agent 302 to one or more of access routers 308-314 and then to wireless terminal 306. Pursuant to an example, at least access routers 308 and 310 can be associated with mobility modules 316 and 318, respectively, wherein mobility modules 316 and 318 allow access routers 308 and 310 to act as regional mobility agents. In other words, wireless terminal 306 can simultaneously have links with a plurality of access routers, and an access router acting as a regional mobility agent can receive traffic from mobility agent 302 and then selectively disseminate such traffic amongst a plurality of access routers associated therewith for transmittal to wireless terminal 306. Additionally, access routers can receive data from wireless terminal 306 over a plurality of uplinks, can direct such data to an access router acting as a regional mobility agent, which can then aggregate the traffic and provide it to mobility agent 302.

In a detailed example, access router 308 can initially act as a regional mobility agent with respect to wireless terminal 306. Wireless terminal 306 can have links with access router 308, access router 310, access router 312, and access router 314. A tunnel can exist between mobility agent 302 and access router 308, such that traffic intended for wireless terminal 306 is first provided to access router 308. Access router 308 then can selectively disseminate traffic amongst access router 308 and the other access routers 310-314 that have links with wireless terminal 306. In architecture 300, wireless terminal 306 can, based upon any suitable metric or condition, select which access router is to act as a regional mobility agent. Pursuant to an example, wireless terminal 306 can select an access router that is associated with a highest signal-to-noise (SNR) ratio to act as a regional mobility agent.

As stated above, wireless terminal 306 may request that access router 308 act as a regional mobility agent. As wireless terminal 306 transitions over a geographic region and/or signal strengths change, wireless terminal 306 can request that access router 310 serve as a regional mobility agent with respect to wireless terminal 306. Additionally, within the request wireless terminal 306 can indicate which access routers should service wireless terminal. For instance, wireless terminal 306 can indicate that it desires links with access routers 308-314. Such information can be relayed by way of Mobile IP to access muter 310 (or another suitable access router), which can inform mobility agent 302 of the request. Mobility agent 302 can then redirect a tunnel from access router 308 to access router 310 (by way of Mobile IP messaging). Access router 310 can then create add messages and provide such messages to access router 308, access router 312, and access router 314. Thus, access router 308 will be implicitly informed that access router 308 will no longer be acting as a regional mobility agent. Additionally, access router 312 and access router 314 will be prepared for traffic intended for wireless terminal 306 that will be relayed from access router 310 (and not access router 308). While what has been described above relates to an access router acting as a regional mobility agent, it is understood that separate network modules acting as regional mobility agents can utilize add messages, in a similar manner.

Figure 4:
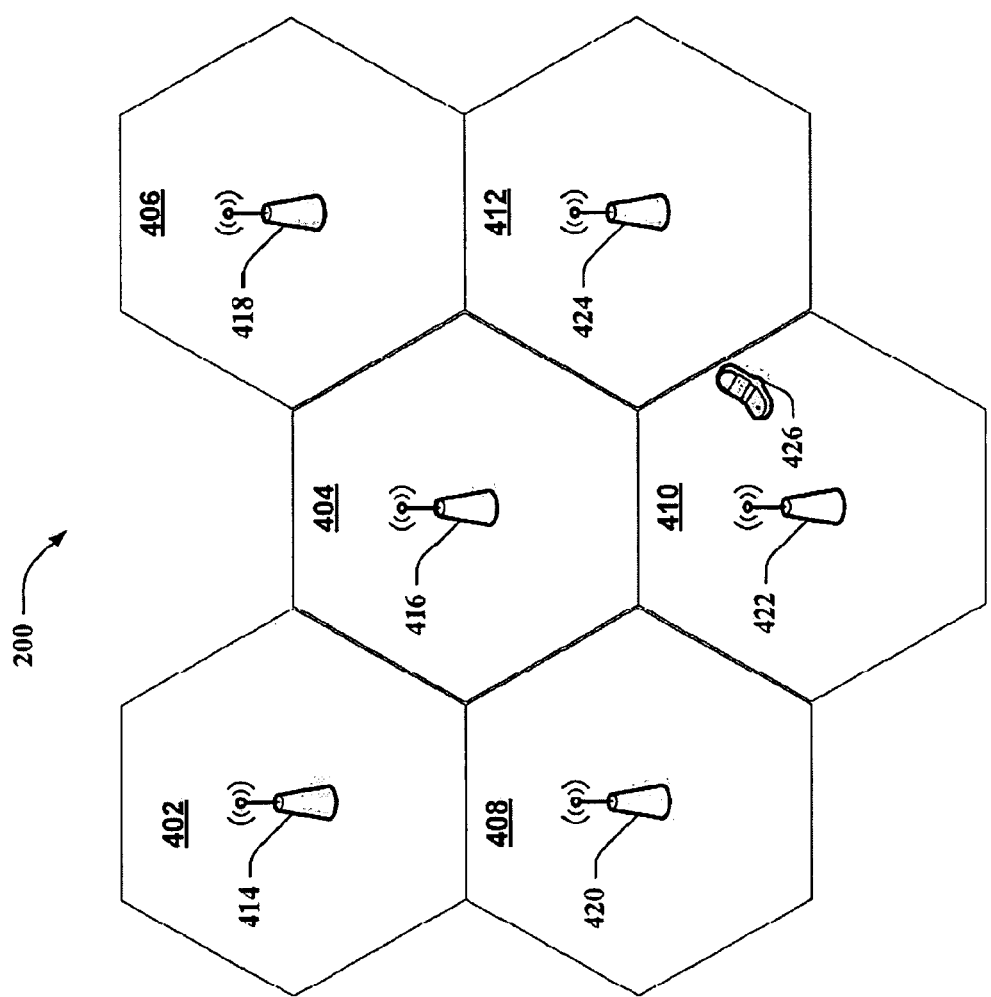
FIG. 4 is an example of a wireless communication system according to one embodiment.

Now turning to FIG. 4, an example wireless communications system 400 is illustrated. The system 400 includes a plurality of sectors 402-412, wherein a wireless terminal can employ wireless services within such sectors 402-412. While the sectors 402-412 are shown as being hexagonal in nature and of substantially similar size, it is understood that size and shape of sectors 402-412 can vary depending upon geographical region, number, size, and shape of physical impediments, such as buildings, and several other factors. Access points (base stations, access routers, etc.) 414-424 are associated with sectors 402-412, wherein access points 414-424 are utilized to provide services to user equipment within sectors 402-412. Additionally, one or more of access points 414-424 can act as a regional mobility agent with respect to other access points and a wireless terminal within system 400. For instance, in system 400, a wireless terminal 426 can have physical links with access point 422 and access point 424. It is to be understood, however, that wireless terminal 426 may have physical links with more than two access points at any particular point in time. Continuing with the example, access point 422 may serve as a regional mobility agent with respect wireless terminal 426, and therefore can relay traffic intended for wireless terminal 426 to access point 424. Access point 424 can then transmit such traffic to wireless terminal 426.

As wireless terminal 426 is geographically ported, it may receive signals with greater strength from access point 424 when compared to signals received from access point 422. Accordingly, wireless terminal 426 can create a message that indicates that access point 424 should act as a regional mobility agent and that wireless terminal 426 additionally desires a link with access point 422. Such information can be transmitted to a mobility agent (not shown) byway of Mobile IP. The mobility agent can then revoke a tunnel with access point 422 and create a tunnel with access point 424 (the new regional mobility agent). Access point 424 can then create an add message and transmit the add message to access point 422, such that access point 422 can be prepared to receive traffic from access point 424 for transmittal to wireless terminal. As stated above, an add message can come in the form of a command by way of Mobile IP.

Figure 5:
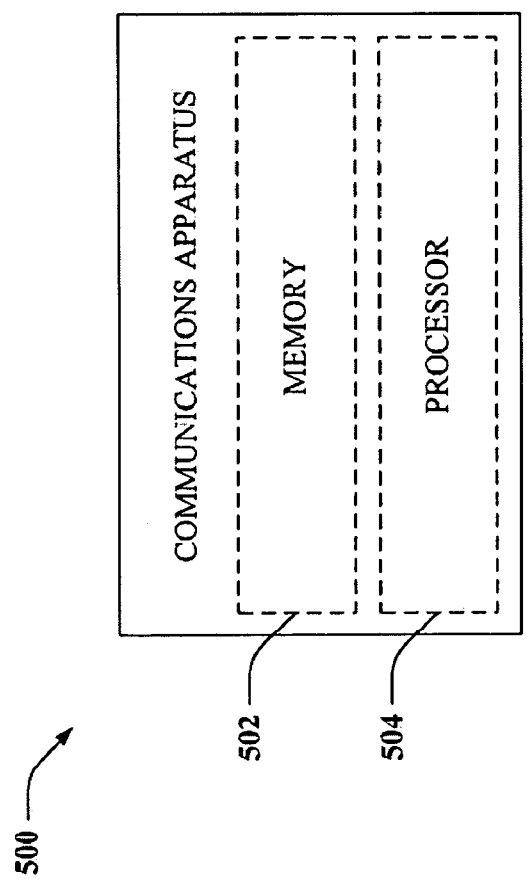
FIG. 5 is an example apparatus that facilitates creation of add messages.

With reference now to FIG. 5, a communications apparatus 500 for employment within a wireless communications environment is illustrated. Apparatus 500 can be or include a mobility agent, a foreign agent, a regional mobility agent, an access router, a wireless terminal, and/or the like. Apparatus 500 can include a memory 502 that retains instructions that relate to utilization of an add message to inform one or more access routers that the access routers will be receiving traffic for a wireless terminal from a certain regional mobility agent (which can be within an access router, within a foreign agent, a mobility agent, or other suitable network module).

In an example, apparatus 500 can be a mobility agent or foreign agent, which may be a server, a collection of servers, within a sewer, and/or distributed amongst a collection of servers. In such a case, memory 502 can include instructions for receiving an indication that a wireless terminal desires a physical link with a particular access router. Such link can be in addition to another link that is pre-existent with respect to the wireless terminal. Memory 502 can additionally include instructions for transmitting an add message to the access router indicated within the request, wherein the add message informs the access router that the mobility agent will be providing traffic to the access router that is intended for the wireless terminal. Apparatus 500 can additionally include a processor 504 that is configured to execute the instructions within memory 502.

In another example, apparatus 500 can be an access router that can act as a regional mobility agent with respect to a wireless terminal. In such a case, memory 502 can include instructions for receiving a request from a wireless terminal that the access router act as a regional mobility agent with respect to wireless terminal. Memory 502 can also retain instructions for receiving other access routers with respect to which the access terminal desires a physical link. Still further, memory 502 can include instructions for creating and transmitting an add message to other access routers identified by the wireless terminal. Thus, the other access routers can remove tunnels associated with an access router (or other network module) previously acting as a regional mobility agent) and create funnels with the access router now acting as the regional mobility agent. Processor 504 can be configured to execute the instructions.

In yet another example, apparatus can be a wireless terminal. Memory 502 can include instructions for identifying which access router desirably acts as a regional mobility agent with respect to the wireless terminal. Memory 502 can also include instructions for identifying one or more access routers with respect to which wireless terminal desires physical links. Moreover, memory 502 can include instructions for transmitting the identified access routers (by way of Mobile IP) to an access router or mobility agent associated with the wireless terminal. Again, processor 504 can be configured to execute the instructions stored in memory 502.

Figure 6:
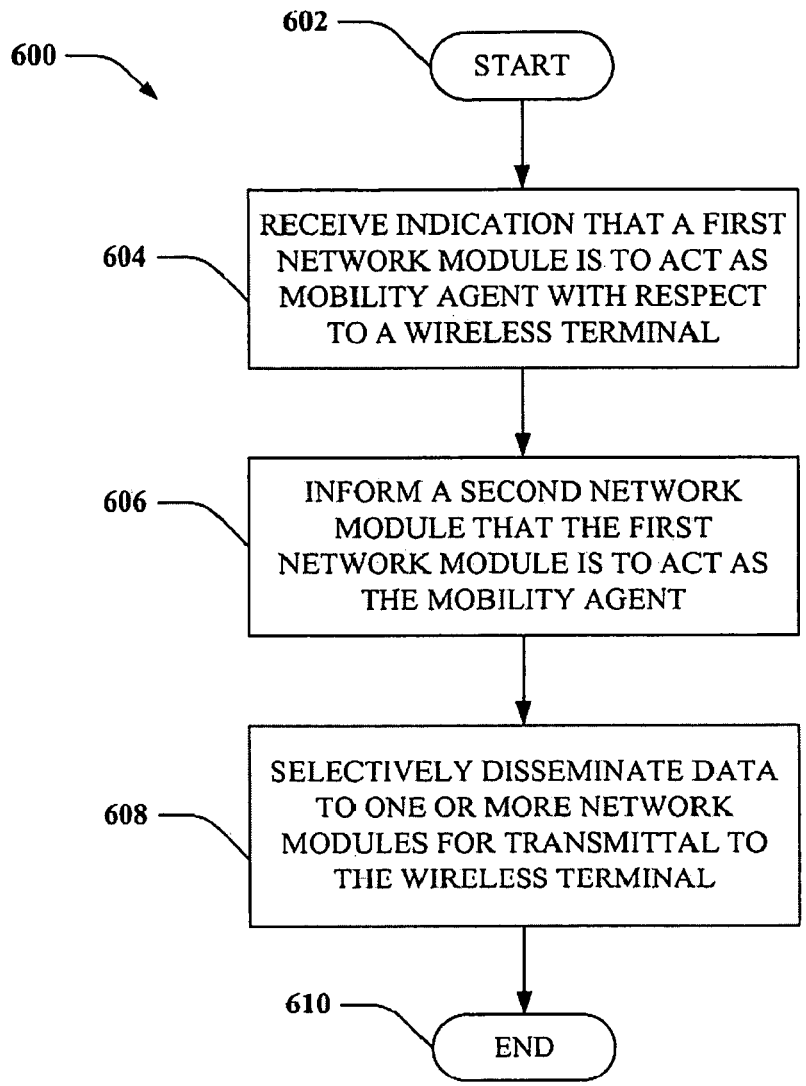
FIG. 6 is a representative flow diagram illustrating an example methodology for selectively disseminating traffic to one or more access routers.
Figure 7:
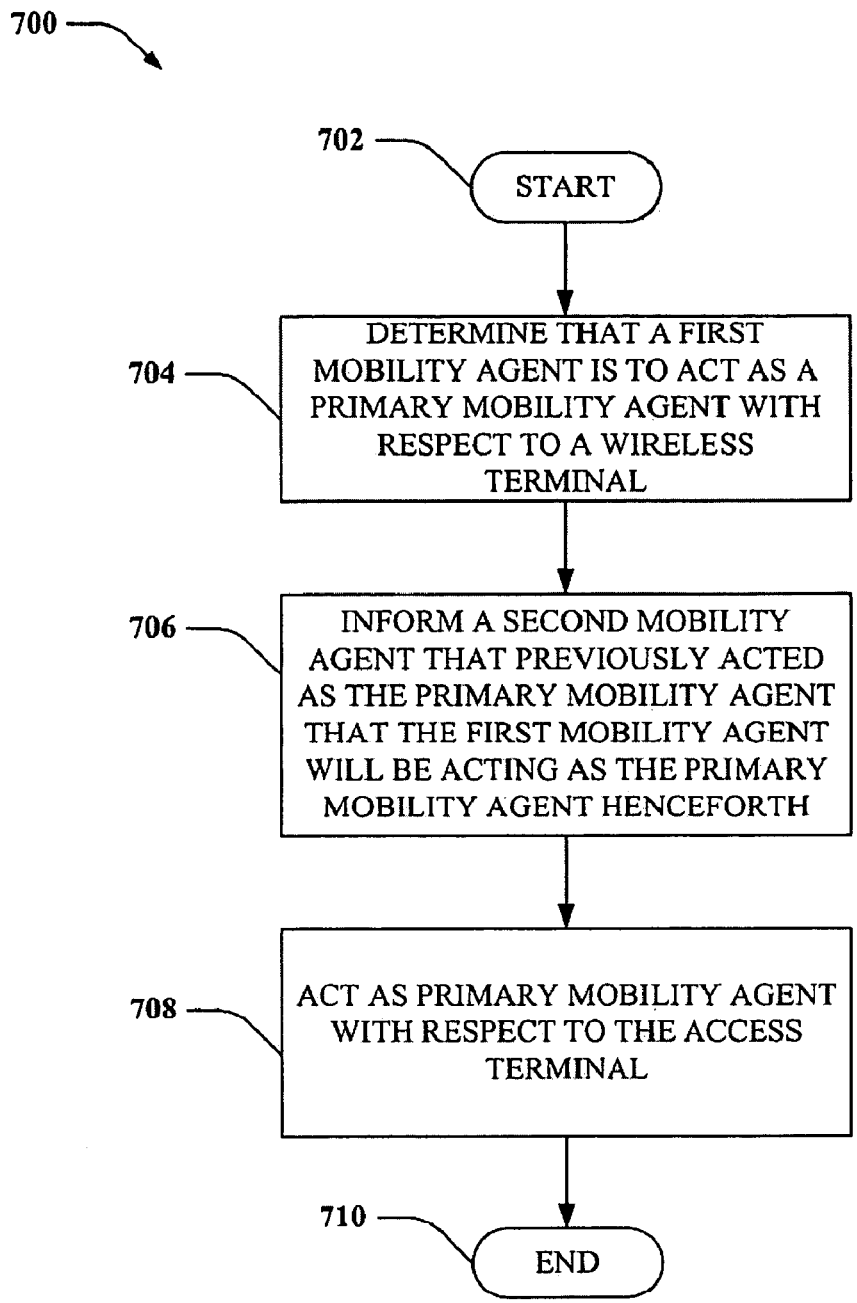
FIG. 7 is a representative flow diagram illustrating an example methodology for configuring a mobility agent to act as a primary mobility agent with respect to a wireless terminal.
Figure 8:
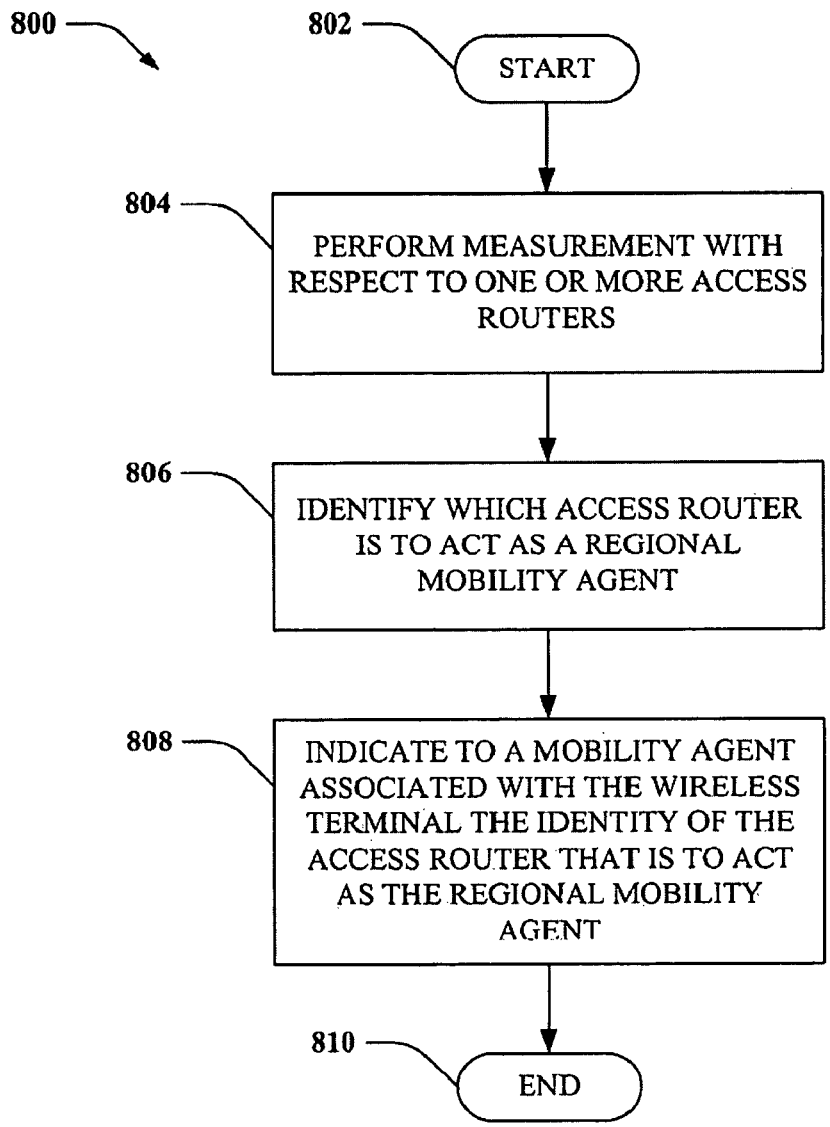
FIG. 8 is a representative flow diagram illustrating an example methodology for indicating which access router is to act as a regional mobility agent with respect to a wireless terminal.

Referring to FIGS. 6-8, methodologies relating to generation of add messages are illustrated. While, for purposes of simplicity of explanation, the methodologies are shown and described as a series of acts, it is to be understood and appreciated that the methodologies are not limited by the order of acts, as some acts may occur in different orders and/or concurrently with other acts from that shown, and described herein. For example, those skilled in the art will understand and appreciate that a methodology could alternatively be represented as a series of interrelated states or events, such as in a slate diagram. Moreover, not all illustrated acts may be utilized to implement a methodology in accordance with one or more embodiments.

Referring solely to FIG. 6, a methodology 600 for selectively disseminating data to a network module for transmittal to a wireless terminal is illustrated. Methodology 600 starts at 602, and at 604 an indication is received that a first network module is to act as a mobility agent with respect to a wireless terminal. The network module can be a mobility agent, a foreign agent, an access router with capabilities to act as a regional mobility agent and/or the like. At 606, a second network module is informed that the first network module is to act as the mobility agent. For instance, the second network module can be an access router that has a physical link with a wireless terminal, such that the access router can configure a link with the first network module. In another example, the second network module can he a mobility agent, wherein a message indicates that the first network module is "taking over" for the mobility agent.

At 608, data is selectively disseminated to one or more network modules for transmittal to the wireless terminal. For example, if the first network module is an access router, such access router can disseminate traffic intended for the wireless terminal to one or more different access routers for transmittal to the wireless terminal. If the first network module is a foreign agent, the foreign agent can relay a subset of traffic to one or more access routers related to the foreign agent for transmittal to the wireless terminal. The methodology 600 completes at 610.

Now referring to FIG. 7, a methodology 700 for configuring a mobility agent to act as a primary mobility agent is illustrated. Methodology 700 starts at 702, and at 704 a determination is made that a first mobility agent is to act as a primary mobility agent with respect, to a wireless terminal. For example, for purposes of redundancy one mobility agent can act as a primary mobility agent while another mobility agent is a standby mobility agent. The determination can be made upon receipt of information from the wireless terminal, wherein a primary mobility agent is explicitly identified.

At 706, a second mobility agent (that previously acted as the primary mobility agent) is informed that the first mobility agent will be acting as the primary mobility agent henceforth. This can be implicitly determined at the second mobility agent upon receipt of an add message, for example. At 708, the first mobility agent acts as the primary mobility agent with respect to the access terminal, and the methodology 700 completes at 710.

With reference now to FIG. 8, a methodology 800 for indicating which access router is to act as a regional mobility agent with respect to a wireless terminal is illustrated. Pursuant to an example, a wireless terminal can be configured to perform the methodology 800. The methodology 800 starts at 802, and at 804 measurements are performed by a wireless terminal with respect to one or more access routers. For instance, signal strength perceived by a wireless terminal with respect to a plurality of access routers can be measured.

At 806, the wireless terminal can identify which access router is to act as a regional mobility agent. Such identification can be a function of the performed measurements. At 808, an indication of an identity of the access router that is to act as the regional mobility agent is transmitted to a mobility agent associated with the wireless terminal. Thus, the mobility agent can create a runnel between the mobility agent and the identified access router. The methodology 800 then completes at 810.

Figure 9:
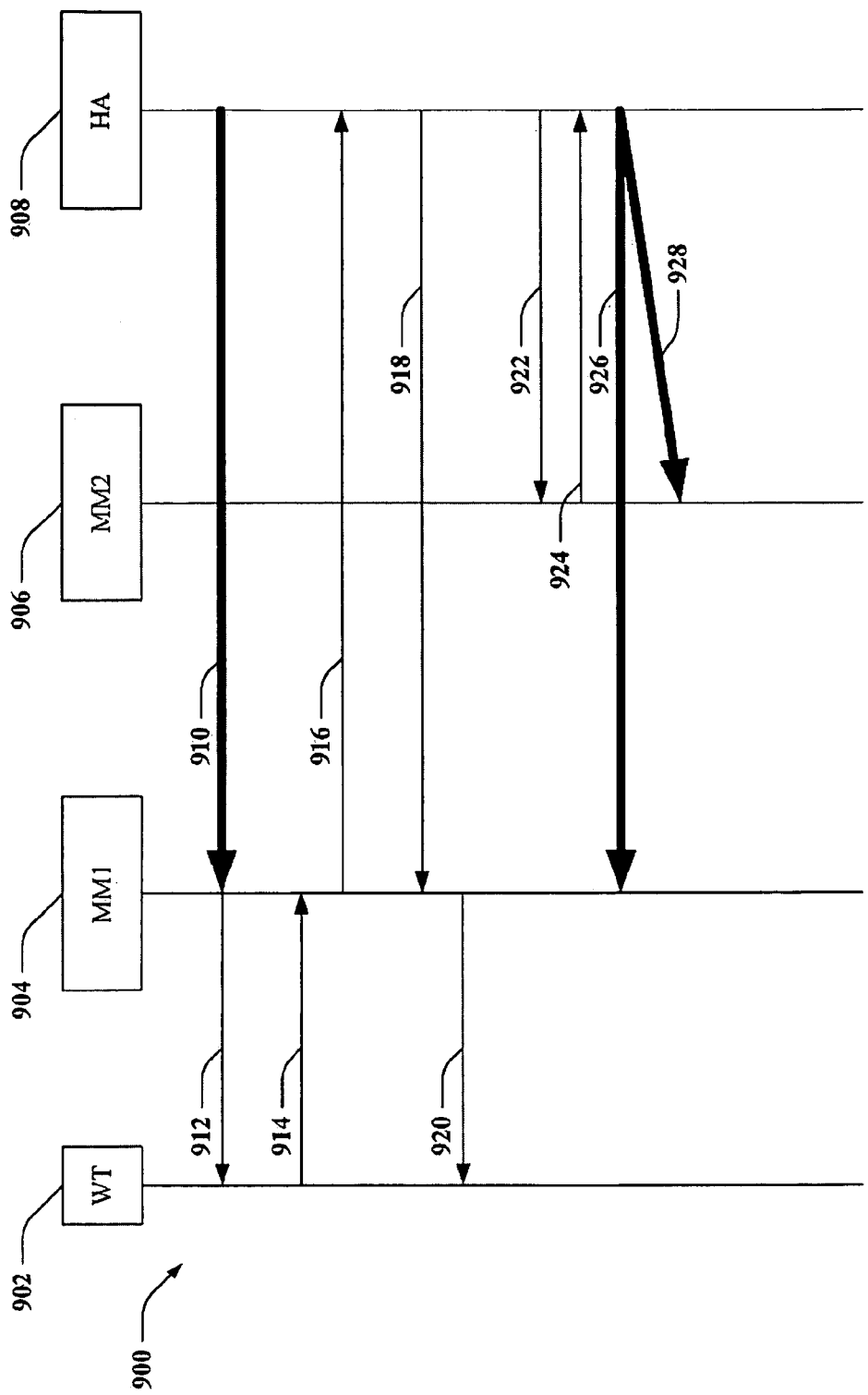
FIG. 9 is an example flow diagram illustrating creation and transmittal of an add message.

With reference now to FIG. 9, an example flow diagram 900 illustrating interaction between a wireless terminal 902, a first mobility module 904, a second mobility module 906, and a mobility agent 908 in connection with creating tunnels for traffic intended for wireless terminal 902 is illustrated. In an example, mobility modules 904 and 906 can be foreign agents, access routers and/or be resident within access routers. Additionally, mobility agent 908 can be resident within an access router. At 910, a tunnel is existent between mobility agent 908 and first mobility module 904, such that traffic intended for wireless terminal 902 can be transmitted to mobility module. At 912, a physical link between first mobility module 904 and wireless terminal 902 can be established, such that data can be provided to wireless terminal 902 over the air.

At 914, wireless terminal 902, by way of Mobile IP or other signaling (e.g., link layer mobility management signaling), can indicate to first mobility module 904 that wireless terminal 902 desires a link between first mobility module 904 and second mobility module 906 (with first mobility module 904 being a primary mobility module). At 916, first mobility module relays such information to mobility agent 908 (by way of Mobile IP), and at 918 mobility agent 908 confirms receipt of the information to first mobility module 904. At 920, first mobility module 904 indicates to wireless terminal 902 that mobility agent 908 has received the information (through utilization of a Mobile IP message).

At 922, mobility agent 908 creates an add message and provides the message to second mobility module 906, indicating to second mobility module 906 that second mobility module 906 will be receiving traffic for transmission to wireless terminal 902. The add message can also indicate that the first mobility module may be acting as a regional mobility agent for wireless terminal 902. At 924, second mobility module 906 confirms receipt of the add; message to mobility agent 908. At 926 and 928, tunnels for data are created between mobility agent 908 and first and second mobility modules 904 and 906, respectively. The tunnels are utilized for relay of traffic intended for wireless terminal 902.

Figure 10:
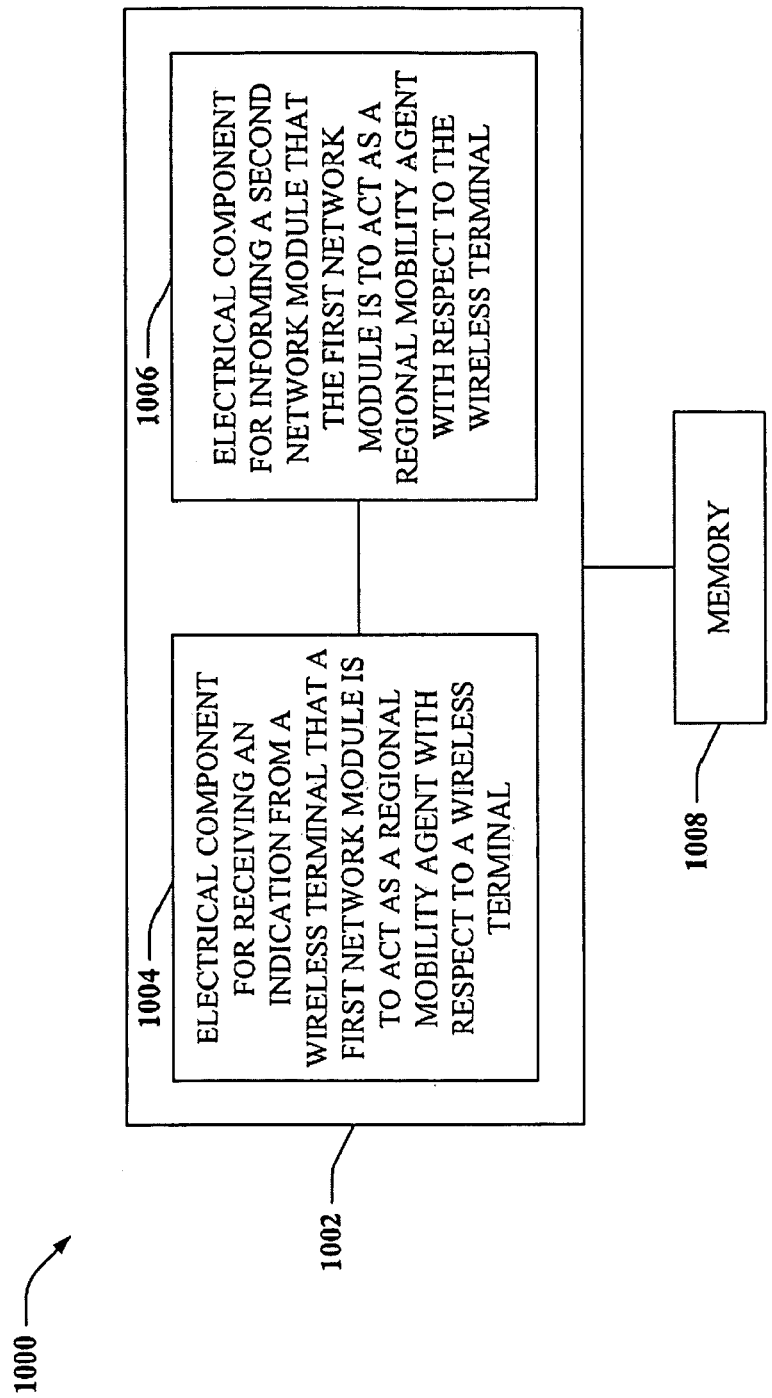
FIG. 10 is an example system that facilitates informing a first network module that a second network module will be acting as a regional mobility agent with respect to a wireless terminal.
Figure 11:
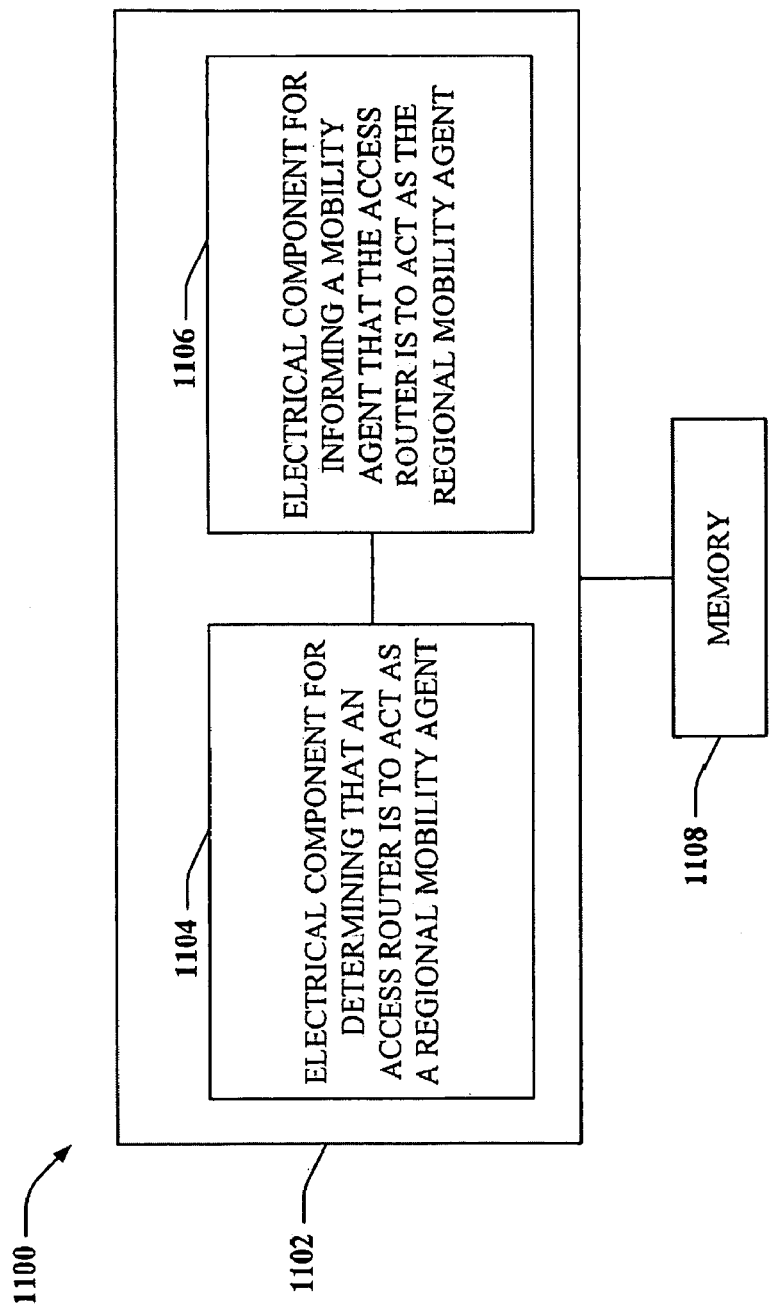
FIG. 11 is an example system that facilitates informing a mobility agent that an access router is to act as a regional mobility agent with respect to a wireless terminal.

Now referring collectively to FIGS. 10 and 11, systems 1000 and 1100 are illustrated, wherein such systems relate to informing foreign agents and/or access routers that they will be receiving traffic intended for a wireless terminal. It is to be appreciated that systems 1000 and 1100 are represented as including functional blocks, wherein such blocks can represent functions implemented by a processor, software, or a combination thereof (e.g., firmware).

Turning specifically to FIG. 10, a system 1000 that facilitates a mobility agent "taking over" for another mobility agent is illustrated. In an example, system 1000 can be a mobility agent and/or a foreign agent. System 1000 includes a grouping 1002 of electrical components, wherein such components can act in conjunction to create an add message. Grouping 1002 includes an electrical component 1004 for receiving an indication from a wireless terminal that a first network module is to act as a regional mobility agent with respect to a wireless terminal. For instance, the first network module can be an access router, a foreign agent, and/or a mobility agent. Grouping 1002 also includes an electrical component 1006 for informing a second network module that the first network module is to act as a regional mobility agent with respect to the wireless terminal. This can be accomplished by providing an add message to the second network module. System 1000 can also include a memory 1008, which can retain instructions relating to executing components 1004-1006. Alternatively, grouping 1002 and contents thereof can be comprised by memory 1008.

With reference to FIG. 11, a system 1100 that facilitates informing a mobility agent that an access router is to act as a regional mobility agent with respect to a wireless terminal is illustrated. Pursuant to an example, system 1100 can be comprised by a wireless terminal. System 1100 includes a grouping 1102 of electrical components that act together to indicate to a mobility agent an identity of an access router that is to act as a regional mobility agent with respect to a wireless terminal. Grouping 1102 includes an electrical component 1104 for determining that an access router is to act as a regional mobility agent. For example, component 1104 can perform signal strength measurements with respect to signals sent to and/or received from an access router. Grouping 1102 also includes an electrical component for informing a mobility agent that the access router is to act as the regional mobility agent with respect to the wireless terminal. System 1100 can also include a memory 1108 that can include instructions for executing components 1104 and 1.106 and/or comprise such components.

Figure 12:
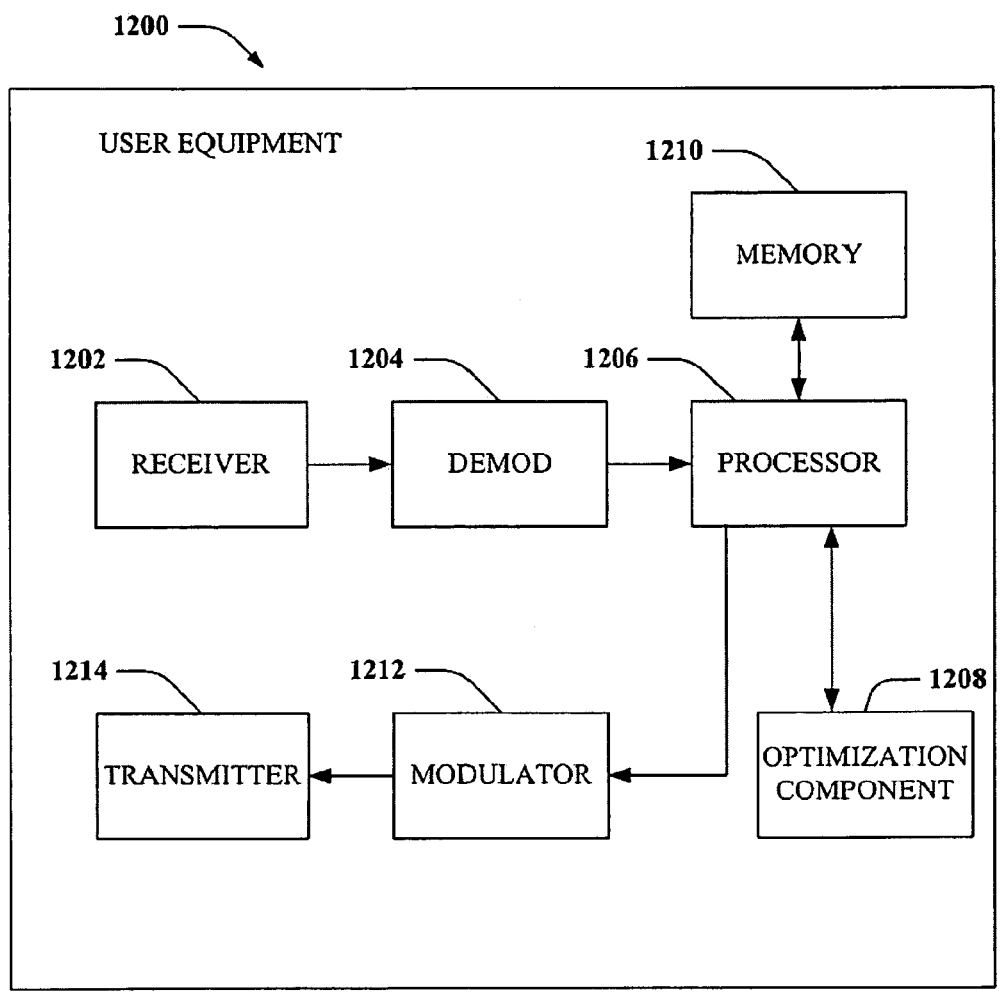
FIG. 12 is an illustration of an example system that can be utilized in connection with informing a mobility agent of an access router that desirably acts as a regional mobility agent.

FIG. 12 illustrates a system 1200 that can be utilized in connection with identifying an access router that is to act as a regional mobility agent and to also identify access routers that are desirably associated with a link to system 1200. System 1200 comprises a receiver 1202 that receives a signal from, for instance, one or more receive antennas, and performs typical actions thereon (e.g., filters, amplifies, downconverts, . . . ) the received signal and digitizes the conditioned signal to obtain samples. A demodulator 1204 can demodulate and provide received pilot symbols to a processor 1206 for channel estimation.

Processor 1206 can be a processor dedicated to analyzing information received by receiver component 1202 and/or generating information for transmission by a transmitter 1214. Processor 1206 can be a processor that controls one or more portions of system 1200, and/or a processor that analyzes information received by receiver 1202, generates information for transmission by a transmitter 1214, and controls one or more portions of system 1200. System 1200 can include an optimization component 1208 that can optimize performance of user equipment before, during, and/or after handoff. Optimization component 1208 maybe incorporated into the processor 1206. It is to be appreciated that optimization component 1208 can include optimization code that performs utility based analysis in connection with determining which access router is to act as a regional mobility agent and to which access routers links are desired. The optimization code can utilize artificial intelligence based methods in connection with performing inference and/or probabilistic determinations and/or statistical-based determination in connection with making the aforementioned determinations.

System (user equipment) 1200 can additionally comprise memory 1210 that is operatively coupled to processor 1206 and that stores information such as signal strength information with respect to a base station (transceiver module), scheduling information, and the like wherein such information can be employed in connection with determining which access router is to act as a regional mobility agent, with respect to system 1200. Memory 1210 can additionally store protocols associated with generating lookup tables, etc., such that system 1200 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or Hash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1210 is intended to comprise, without being limited to, these and any other suitable types of memory. Processor 1206 is connected to a symbol modulator 1212 and transmitter 1214 that transmits the modulated signal.

Figure 13:
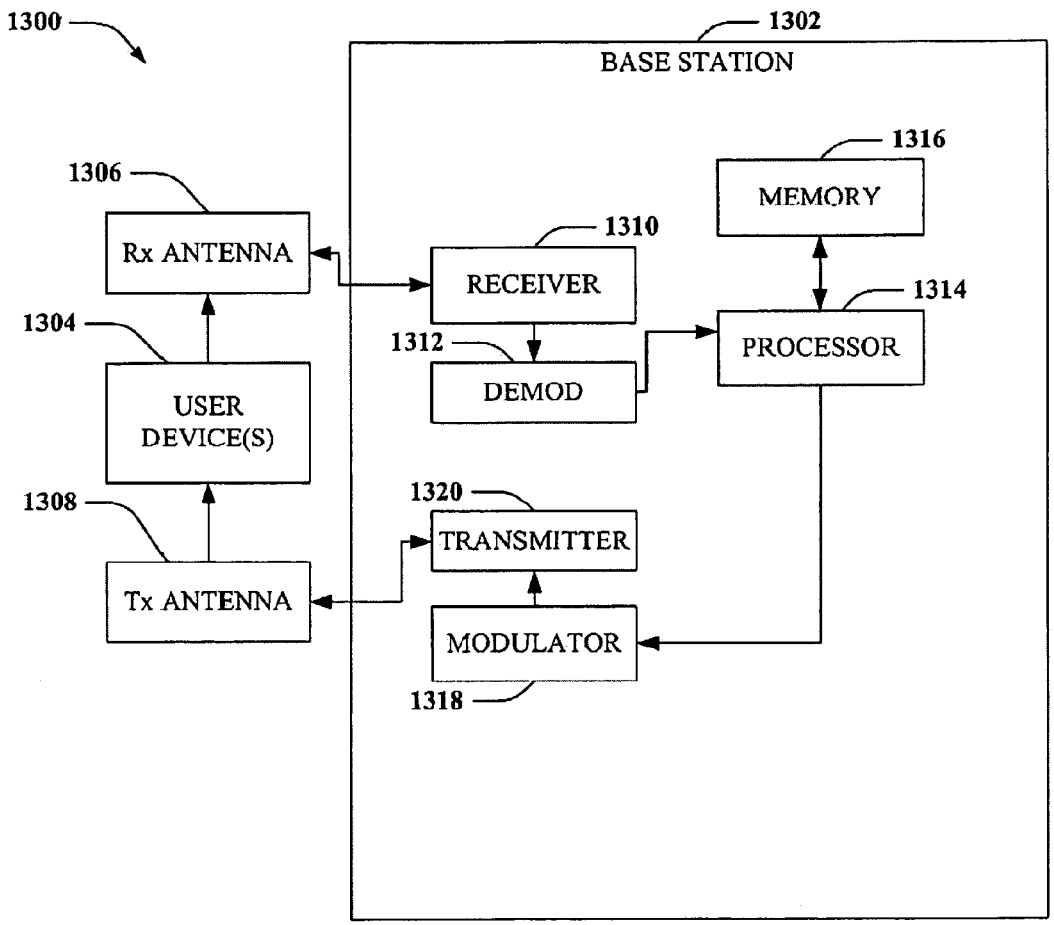
FIG. 13 is an illustration of an example system that can be utilized in connection with generating add messages.

FIG. 13 illustrates a system that can be configured to act as a regional mobility agent. System 1300 comprises a base station 1302 with a receiver 1310 that receives signal(s) from one or more user devices 1304 by way of one or more receive antennas 1306, and transmits to the one or more user devices 1304 through a plurality of transmit antennas 1308. In one example, receive antennas 1306 and transmit antennas 1308 can be implemented using a simple set of antennas. Receiver 1310 can receive information from receive antennas 1306 and is operatively associated with a demodulator 1312 that demodulates received information. Receiver 1310 can be, for example, a Rake receiver (e.g., a technique that individually processes multi-path signal components using a plurality of baseband correlators, ... ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1314 that is similar to the processor described above with regard to FIG. 12, and is coupled to a memory 1316 that stores information related to user device assignments, lookup tables related thereto and the like. Receiver output for each antenna cap be jointly processed by receiver 1310 and/or processor 1314. A modulator 1318 can multiplex the signal for transmission by a transmitter 1320 through transmit antennas 1308 to user devices 1304.

It is to be understood that the embodiments described herein may be implemented by hardware, software, firmware, middleware, microcode, or any combination thereof. For a hardware implementation, the processing units within an user equipment or a network device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc, may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case It can be communicatively coupled to the processor through, various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method operable by an access router, the method comprising:
  receiving an indication from a wireless terminal that the access router is to receive data intended for the wireless terminal;

relaying said data to the wireless terminal; and informing another access router that the access router is to receive said data intended for the wireless terminal and relay said data to the wireless terminal.

2. The method of claim 1, wherein the access router comprises a mobility agent.

3. The method of claim 1, wherein the access router comprises a foreign agent.

4. The method of claim 1, further comprising informing the other access router that the data intended for the wireless terminal will be delivered to the other access router.

5. The method of claim 1, further comprising informing a further access router that a tunnel between the access router and the further access router has been removed.

6. The method of claim 1, wherein informing the other access router that the access router is to receive data intended for the wireless terminal is undertaken in accordance with Mobile IP.

7. The method of claim 1, wherein the other access router was previously receiving data intended for the wireless terminal.

8. The method of claim 1, further comprising:

receiving said data intended for the wireless terminal from a mobility agent, wherein relaying said data to the wireless terminal comprises selectively relaying a subset of the data to the other access router for transmission to the wireless terminal.

9. The method of claim 1, further comprising ensuring the wireless terminal receives that data during a handoff between the access router and the other access router.

10. An access router comprising:

a processor; and circuitry coupled to the processor, the circuitry and the processor being cooperatively configured to:

receive an indication from a wireless terminal that the circuitry and the processor are receive data intended for the wireless terminal;

relay said data to the wireless terminal; and inform another access router that the circuitry and the processor are to receive said data intended for the wireless terminal and relay said data to the wireless terminal.

11. The access router of claim 10, wherein the access router and the other access router are regional mobility agents.

12. The access router of claim 10, wherein the circuitry and the processor are further cooperatively configured to inform the other access router that the circuitry and the processor are to receive said data intended for the wireless terminal by way of Mobile IP.

13. The access router of claim 10 wherein the circuitry and the processor are further cooperatively configured to indicate to the other access router that a tunnel between the access router and the other access router has been revoked.

14. The access router of claim 10, wherein the circuitry and the processor are further cooperatively configured to ensure the wireless terminal receives that data during a handoff between the access router and the other access router.

15. An access router comprising:

means for receiving an indication from a wireless terminal that the access router is to receive data intended for the wireless terminal;

means for relaying said data to the wireless terminal; and means for informing another access router that the access router is to receive data intended for the wireless terminal and relay said data to the wireless terminal.

16. The access router of claim 15, further comprising means for informing the other access router that a tunnel between the access router and the other access router has been removed.

17. The access router of claim 15, wherein the means for receiving is further configured to receive said data from a mobility agent, and wherein the means for relaying is configured to relay said data to the wireless terminal by relaying a subset of the data to the other access router for transmittal to the wireless terminal.

18. The access router of claim 15, wherein the access router is configured to ensure the wireless terminal receives that data during a handoff between the access router and the other access router.

19. A non-transitory computer-readable medium comprising computer-executable instructions stored thereon for:

receiving an indication from a wireless terminal that an access router is to receive data intended for the wireless terminal;

relaying said data to the wireless terminal; and informing another access router that the access router is to receive said data intended for the wireless terminal and relay said data to the wireless terminal.

20. An access router comprising the computer-readable medium of claim 19.

21. The non-transitory computer-readable medium of claim 19, wherein the indication is received by way of Mobile IP.

22. The non-transitory computer-readable medium of claim 19 comprising further computer-executable instructions for:

receiving said data intended for the wireless terminal, and wherein relaying said data to the wireless terminal comprises selectively disseminating a subset of the data to the other access router for transmittal to the wireless terminal.

23. The non-transitory computer-readable medium of claim 22, further comprising computer-executable instructions for transmitting a subset of the data to the wireless terminal.

24. The non-transitory computer-readable medium of claim 19, wherein the computer-executable instructions are configured to ensure the wireless terminal receives that data during a handoff between the access router and the other access router.

25. A method operable by a wireless terminal, the method comprising:

identifying an access router that is to receive data intended for the wireless terminal and relay said data to the wireless terminal; and indicating to another access router associated with the wireless terminal the identity of the access router and that the access router is to receive data intended for the wireless terminal and relay said data to the wireless terminal.

26. The method of claim 25, further comprising:

identifying one or more different access routers with respect to which the wireless terminal desires a link; and transmitting such identity of said one or more different access routers to the access router.

27. The method of claim 25, further comprising receiving said data from the other access router via the access router.

28. The method of claim 25, wherein the access router is identified by way of a message that conforms to Mobile IP.

29. The method of claim 25, further comprising measuring signal strengths associated with a plurality of access routers in connection with identifying the access router.

30. A wireless terminal configured to perform the method of claim 25.

31. The method of claim 25, wherein the access router is configured to ensure the wireless terminal receives that data during a handoff between the access router and the other access router.

32. A wireless terminal comprising:
a processor; and
circuitry coupled to the processor, the circuitry and the processor being cooperatively configured to:
identify an access router that is to receive data intended for the wireless terminal and relay said data to the wireless terminal; and
indicate to another access router associated with the wireless terminal the identity of the access router and that the access router is to receive data intended for the wireless terminal and relay said data to the wireless terminal.

33. The wireless terminal of claim 32, wherein the circuitry and the processor are further cooperatively configured to perform measurements with respect to a plurality of access routers to identify the access router.

34. The wireless terminal of claim 32, wherein the circuitry and the processor are further cooperatively configured to communicate with the access router by way of Mobile IP.

35. The wireless terminal of claim 32, wherein the access router is configured to ensure the wireless terminal receives that data during a handoff between the access router and the other access router.

36. A non-transitory computer-readable medium comprising computer-executable instructions stored thereon for:
identifying an access router that is to receive data intended for the wireless terminal and relay said data to the wireless terminal; and
informing another access router of the identity of the access router and that the access router is to receive data intended for the wireless terminal and relay said data to the wireless terminal.

37. The non-transitory computer-readable medium of claim 36 comprising further computer-executable instructions for:
identifying the other access router with respect to which the wireless terminal desires a link; and
transmitting the identity of the other access router to which the wireless terminal desires the link to the access router.

38. The non-transitory computer-readable medium of claim 37 comprising further computer-executable instructions for undertaking signal strength measurements in connection with identifying the access router.

39. The non-transitory computer-readable medium of claim 36, wherein the access router is configured to ensure the wireless terminal receives that data during a handoff between the access router and the other access router.

40. A wireless terminal comprising:
means for identifying an access router that is to receive data intended for the wireless terminal and relay said data to the wireless terminal; and
means for indicating to another access router associated with the wireless terminal the identity of the access router and that the access router is to receive data intended for the wireless terminal and relay said data to the wireless terminal.

41. The wireless terminal of claim 40, wherein the means for identifying is further configured to identify at least one access router with respect to which the wireless terminal desires a physical link, and further comprising means for informing is further access router of the identity of the at least one access router.

42. The wireless terminal of claim 40, wherein the access router is configured to ensure the wireless terminal receives that data during a handoff between the access router and the other access router.

* * * * *